US012801152B2

(12) United States Patent
Brookins et al.

(10) Patent No.: US 12,801,152 B2
(45) **Date of Patent: *Nov. 17, 2026**

(54) SYSTEMS AND METHODS FOR USING RISK PROFILES FOR CREATING AND DEPLOYING NEW VEHICLE EVENT DEFINITIONS TO A FLEET OF VEHICLES

(71) Applicant: SmartDrive Systems, Inc., Westlake, TX (US)

(72) Inventors: Nicholas Shayne Brookins, Encinitas, CA (US); David Forney, La Jolla, CA (US); Reza Ghanbari, San Diego, CA (US); Jason Palmer, Carlsbad, CA (US); Mark Freitas, San Diego, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,435

(22) Filed: Dec. 19, 2024

(65) Prior Publication Data

US 2025/0130568 A1 Apr. 24, 2025

Related U.S. Application Data

(63) Continuation of application No. 18/477,731, filed on Sep. 29, 2023, now Pat. No. 12,216,473, which is a (Continued)

(51) Int. Cl.
*G08G 1/01* (2006.01)
*B60W 30/09* (2012.01)
(Continued)

(52) U.S. Cl.
CPC ......... *G05D 1/617* (2024.01); *B60W 30/0953* (2013.01); *B60W 30/0956* (2013.01);
(Continued)

(58) Field of Classification Search
CPC .......... G05D 1/617; G05D 1/69; G05D 1/693; B60W 30/0953; B60W 30/0956; B60W 2556/10; B60W 40/10; G07C 5/008; G08G 1/0129; G08G 1/20; G06Q 10/0635; G07B 15/00; G01C 21/34
See application file for complete search history.

(56) References Cited

U.S. PATENT DOCUMENTS

2013/0345927 A1* 12/2013 Cook .................. G07C 5/0808 701/33.4
2017/0357862 A1* 12/2017 Tatsubori ............ G08G 1/0112

* cited by examiner

*Primary Examiner* — Rodney A Butler
(74) *Attorney, Agent, or Firm* — Esplin & Associates, PC

(57) ABSTRACT

Systems and methods for using risk profiles for creating and deploying new vehicle event definitions to a fleet of vehicles are disclosed. Exemplary implementations may: obtain a first risk profile, a second risk profile, and vehicle event characterization information; select individual ones of the previously detected vehicle events that have one or more characteristics in common; determine circumstances for at least a predefined period prior to occurrences of the selected vehicle events; create a new vehicle event definition based on the determined set of circumstances; distribute the new vehicle event definition to individual vehicles in the fleet of vehicles; and receive additional vehicle event information from the individual vehicles in the fleet of vehicles.

19 Claims, 3 Drawing Sheets

Related U.S. Application Data continuation of application No. 17/571,339, filed on Jan. 7, 2022, now Pat. No. 11,815,898, which is a continuation of application No. 16/400,903, filed on May 1, 2019, now Pat. No. 11,262,763.

(51) Int. Cl.

| | |
|---|---|
| ***B60W 30/095*** | (2012.01) |
| ***G05D 1/00*** | (2006.01) |
| ***G05D 1/02*** | (2020.01) |
| ***G05D 1/617*** | (2024.01) |
| ***G05D 1/69*** | (2024.01) |
| ***G05D 1/693*** | (2024.01) |
| ***G07C 5/00*** | (2006.01) |

(52) U.S. Cl.

CPC ......... *G05D 1/0214* (2013.01); *G05D 1/0291* (2013.01); *G05D 1/69* (2024.01); *G05D 1/693* (2024.01); *G07C 5/008* (2013.01); *G08G 1/0129* (2013.01); *B60W 2556/10* (2020.02)

SYSTEMS AND METHODS FOR USING RISK PROFILES FOR CREATING AND DEPLOYING NEW VEHICLE EVENT DEFINITIONS TO A FLEET OF VEHICLES

FIELD OF THE DISCLOSURE

The present disclosure relates to systems and methods for using risk profiles for creating and deploying new vehicle event definitions to a fleet of vehicles. The risk profiles characterize values representing likelihoods of occurrences of vehicle events. The values are based on vehicle event information for previously detected vehicle events.

BACKGROUND

Systems configured to record, store, and transmit video, audio, and sensor data associated with a vehicle, e.g. to monitor the speed of a vehicle, are known. Such systems may detect vehicle events such as speeding and transmit relevant event information to a stakeholder. Systems for monitoring and managing a fleet of vehicles, e.g., from a remote location, are known.

SUMMARY

One aspect of the present disclosure relates to a system configured for using risk profiles for creating and deploying new vehicle event definitions to a fleet of vehicles. The system may include one or more hardware processors configured by machine-readable instructions. The processor(s) may be configured to obtain a first risk profile, a second risk profile, vehicle event characterization information, and/or other information. The first risk profile may be specific to a certain context for detecting vehicle events. The first risk profile may characterize a first set of values representing likelihoods of occurrences of vehicle events matching the certain context. The second risk profile may be specific to operators. The second risk profile may characterize a second set of values representing likelihoods of occurrences of vehicle events matching the operators. The vehicle event characterization information may characterize one or more types of vehicle events to be used in creating new vehicle event definitions. The processor(s) may be configured to select individual ones of the previously detected vehicle events that have one or more characteristics in common. The selection may be based on one or more of the first risk profile, the second risk profile, the vehicle event characterization information, and/or other information. The processor (s) may be configured to determine circumstances for at least a predefined period prior to occurrences of the selected vehicle events. The processor(s) may be configured to create a new vehicle event definition based on the determined set of circumstances. The processor(s) may be configured to distribute the new vehicle event definition to individual vehicles in the fleet of vehicles. The processor(s) may be configured to receive additional vehicle event information from the individual vehicles in the fleet of vehicles. The additional vehicle event information may include information regarding detection of additional vehicle events. The additional vehicle events may have been detected in accordance with the new vehicle event definition.

Another aspect of the present disclosure relates to a method for using risk profiles for creating and deploying new vehicle event definitions to a fleet of vehicles. The method may include obtaining a first risk profile, a second risk profile, vehicle event characterization information, and/or other information. The first risk profile may be specific to a certain context for detecting vehicle events. The first risk profile may characterize a first set of values representing likelihoods of occurrences of vehicle events matching the certain context. The second risk profile may be specific to operators. The second risk profile may characterize a second set of values representing likelihoods of occurrences of vehicle events matching the operators. The vehicle event characterization information may characterize one or more types of vehicle events to be used in creating new vehicle event definitions. The method may include selecting individual ones of the previously detected vehicle events that have one or more characteristics in common. The selection may be based on one or more of the first risk profile, the second risk profile, the vehicle event characterization information, and/or other information. The method may include determining circumstances for at least a predefined period prior to occurrences of the selected vehicle events. The method may include creating a new vehicle event definition based on the determined set of circumstances. The method may include distributing the new vehicle event definition to individual vehicles in the fleet of vehicles. The method may include receiving additional vehicle event information from the individual vehicles in the fleet of vehicles. The additional vehicle event information may include information regarding detection of additional vehicle events. The additional vehicle events may have been detected in accordance with the new vehicle event definition.

As used herein, any association (or relation, or reflection, or indication, or correspondency) involving servers, processors, client computing platforms, vehicles, vehicle events, risk profiles, likelihoods, locations, vehicle types, vehicle event types, metrics, characteristics, definitions, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
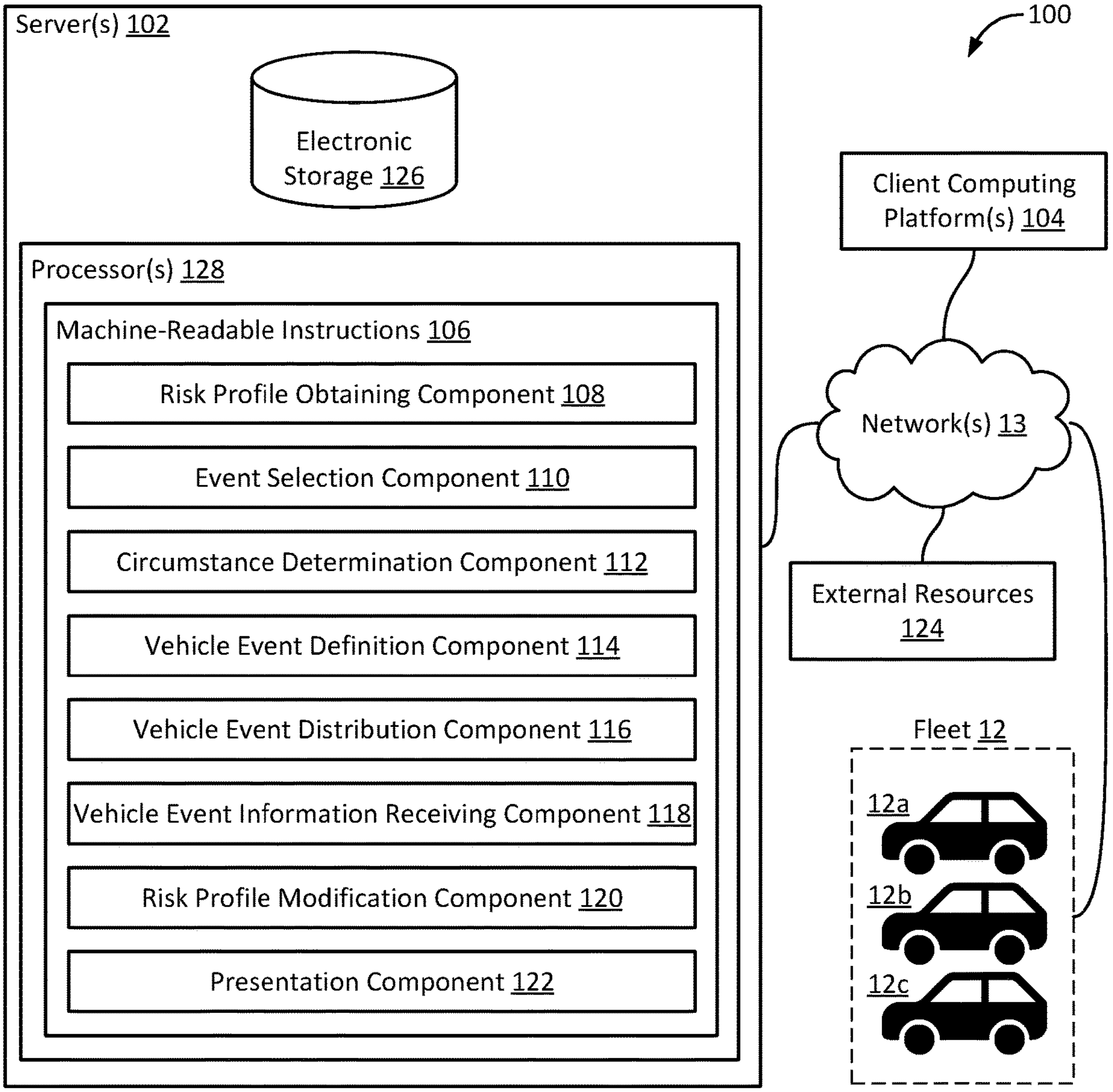
FIG. 1 shows a system configured for using risk profiles for creating and deploying new vehicle event definitions to a fleet of vehicles, in accordance with one or more implementations.

FIG. 1 illustrates a system 100 configured for using risk profiles for creating and deploying new vehicle event definitions to a fleet 12 of vehicles, in accordance with one or more implementations. Fleet 12 may include multiple vehicles. In some implementations, system 100 may be configured to couple with vehicles that are operated by vehicle operators. As used here, the term fleet may refer to a set of at least 5 vehicles, at least 10 vehicles, at least 100 vehicles, at least 1000 vehicles, and/or another number of vehicles. For example, fleet 12 may include a first vehicle 12*a*, a second vehicle 12*b*, a third vehicle 12*c*, a fourth vehicle, and so forth.

The risk profiles may characterize values representing likelihoods of certain occurrences. For example, a first risk profile may be specific to a certain context for detecting vehicle events. The first risk profile may characterize a first set of values representing likelihoods of occurrences of vehicle events matching the certain context. In some implementations, the first risk profile may be context-specific. For example, a second risk profile may be specific to operators. As used herein, an operator involved in a vehicle event may be a human vehicle operator, an autonomous driving algorithm, a type of vehicle, and/or a combination thereof. The second risk profile may characterize a second set of values representing likelihoods of occurrences of vehicle events matching the operators. In some implementations, the second risk profile may be operator-specific. In some implementations, additional and/or different risk profiles are envisioned within the scope of this disclosure. In some implementations, values characterized by risk profiles may be based on vehicle event information for previously detected vehicle events.

Individual vehicles may include a set of resources for data processing and/or electronic storage, including but not limited to persistent storage. Individual vehicles may include a set of sensors configured to generate output signals conveying information, e.g., related to the operation of the individual vehicles. Individual vehicles may be configured to detect vehicle events, e.g., based on output signals generated by sensors.

System 100 may include one or more of fleet 12 of vehicles, server(s) 102, electronic storage 126, client computing platform(s) 104, external resource(s) 124, network(s) 13, and/or other components. In some implementations, system 100 may be a distributed data center, include a distributed data center, or act as a distributed data center. Alternatively, and/or simultaneously, system 100 may be a remote computing server, include a remote computing server, or act as a remote computing server, where a remote computing server is separate, discrete, and/or distinct from the fleet of vehicles. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a risk profile obtaining component 108, an event selection component 110, a circumstance determination component 112, a vehicle event definition component 114, a vehicle event distribution component 116, a vehicle event information receiving component 118, a risk profile modification component 120, a presentation component 122, and/or other instruction components.

Risk profile obtaining component 108 may be configured to obtain and/or determine information, including but not; limited to risk profiles. Risk profiles may include and/or represent likelihoods of occurrences of particular events, including but not limited to vehicle events. In some implementations, risk profiles may include and/or characterize values that represent likelihoods. In some implementations, the obtained and/or determined information may include a first risk profile, a second risk profile, vehicle event characterization information, and/or other information. In some implementations, the first risk profile may be specific to a certain context for detecting vehicle events. By way of non-limiting example, the certain context for detecting vehicle events may include one or more of location, local weather, heading of one or more vehicles, and/or traffic conditions. Alternatively, and/or simultaneously, by way of non-limiting example, the certain context for detecting vehicle events may include one or more of objects on roadways during detection of vehicle events, other incidents within a particular timeframe of detection of vehicle events, time of day, lane information, and/or presence of autonomously operated vehicles within a particular proximity. The first risk profile may characterize a first set of values representing likelihoods of occurrences of vehicle events matching the certain context. In some implementations, the first risk profile may characterize the first set of values representing likelihoods of occurrences of collisions and near-collisions at the individual locations.

In some implementations, the second risk profile may be specific to operators. The second risk profile may characterize a second set of values representing likelihoods of occurrences of vehicle events matching and/or otherwise involving the operators. The vehicle event information may include the certain context for the previously detected vehicle events and the operators for the previously detected vehicle events.

The first set of values, the second set of values, and/or other sets of values for risk profiles may be based on the vehicle event information. In some implementations, the vehicle event information may include information about previously detected vehicle events, including but not limited to certain context for the previously detected vehicle events and/or the operators for the previously detected vehicle events.

In some implementations, the certain context for detecting vehicle events may include one or more of (geographical) location, local weather, heading of one or more vehicles, traffic conditions, and/or other context information. For example, a location-based risk profile may include a set of locations in a particular geographical area where previously detected vehicles events occurred. In some implementations, a location-based risk profile may form the basis for a risk map of the particular geographical area. In some implementations, a risk profile may include traffic conditions (e.g., whether traffic was heavy or light, what kind of participants were part of the traffic, how close other vehicles were, etc.). In some implementations, a risk profile may combine different kinds of context information. For example, a location-based risk profile may also indicate likelihoods of occurrences of certain vehicle events during heavy traffic, light traffic, during rain or snow, heading east or west, and so forth.

In some implementations, the certain context for detecting vehicle events may include one or more of objects on roadways during detection of vehicle events, other incidents within a particular timeframe of detection of vehicle events, time of day, lane information, presence of autonomously operated vehicles within a particular proximity, and/or other (dynamic) context information, as well as combinations thereof.

In some implementations, the vehicle event characterization information may characterize one or more types of vehicle events to be used in creating and deploying new vehicle event definitions. For example, in some scenarios, a new vehicle event definition may be determined based on occurrences of hard braking, because hard braking may be especially important to avoid for certain driving responsibilities. In other scenarios, hard braking may be relatively unimportant and/or common, for example for taxis in certain downtown areas. In such scenarios, the types of vehicle events that correspond to hard braking should not be paramount when creating and/or determining a new vehicle event definition. For example, in some scenarios, a new vehicle event definition may be determined based on occurrences of U-turns, because U-turns may be especially important to avoid for certain driving responsibilities, including but not limited to 18-wheelers. In other scenarios, U-turns may be relatively unimportant and/or common, for example for taxis in certain downtown areas. In such scenarios, the types of vehicle events that correspond to U-turns should not be paramount. In some implementations, vehicle event characterization information may characterize exceeding a speed threshold. In some implementations, vehicle event characterization information may characterize one or more of swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, and/or performing fuel-inefficient maneuvers. In some implementations, vehicle event characterization information may characterize collisions and near-collisions.

Event selection component 110 may be configured to select vehicle events from a set of vehicle events. In some implementations, events may be selected from previously detected vehicle events. For example, selected events may have one or more characteristics in common. By way of non-limiting example, the one or more characteristics may include one or more of geographical location, time of day, demographic information of vehicle operators, a sequence of operations performed by vehicle operators, and/or other characteristics. In some implementations, characteristics may be based on vehicle event information of previously detected vehicle events. In some implementations, characteristics may be based on context. By way of non-limiting example, the selection may be based on one or more of the first risk profile, the second risk profile, the vehicle event characterization information, and/or other information. In some implementations, event selection may be based on statistical analysis of a set of vehicle events. For example, a subset of vehicle events may form a statistical outlier when compared to the entire set of vehicle events. In some implementations, statistical analysis may expose a concentration of events that indicates commonality among those events.

Figure 3:
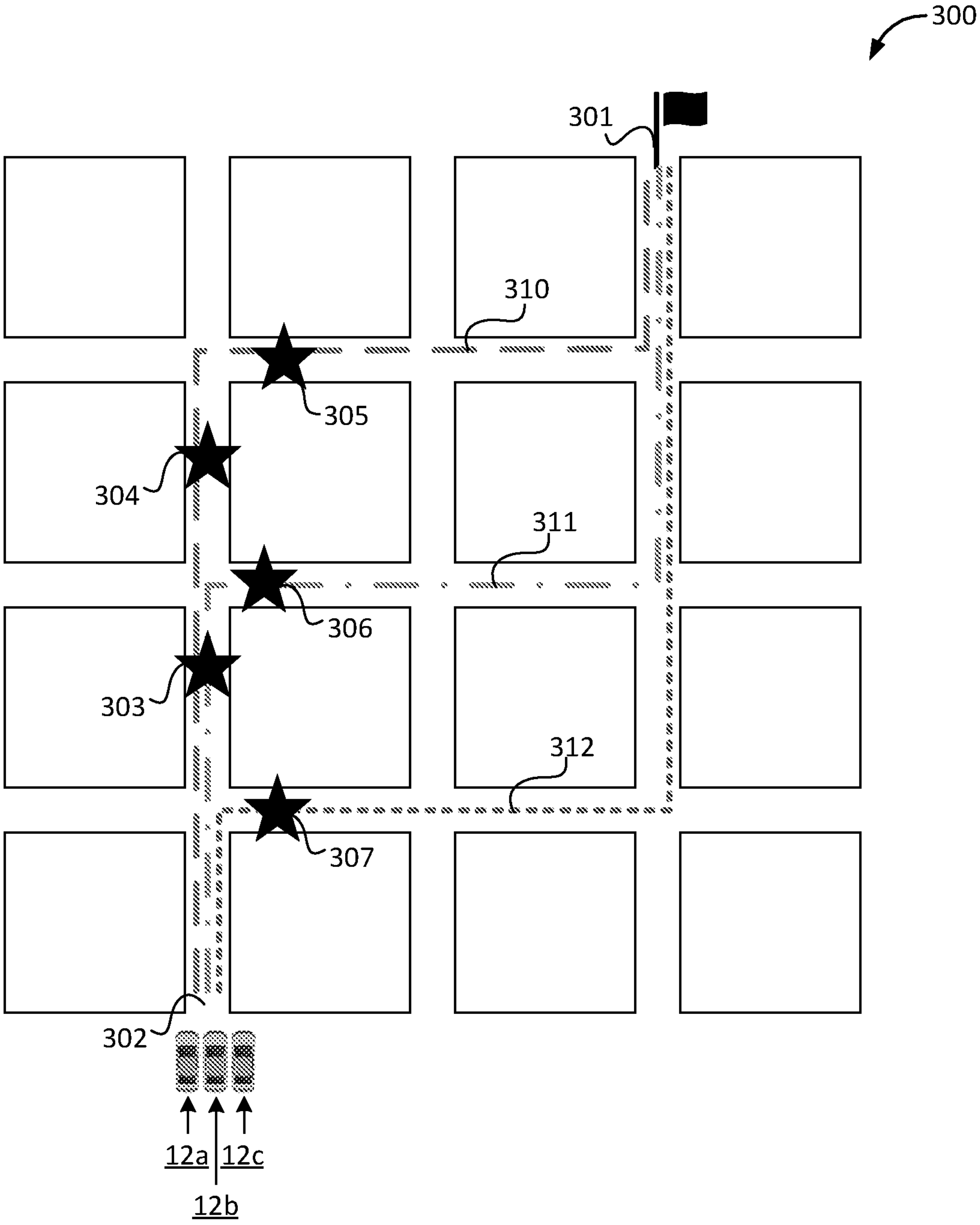
FIG. 3 illustrates a map as may be used by a system configured for using risk profiles for creating and deploying new vehicle event definitions to a fleet of vehicles, in accordance with one or more implementations.

By way of non-limiting example, FIG. 3 illustrates a map 300 depicting a geographical area around vehicles 12*a*-12*b*-12*c* and various routes these vehicles have traversed. For example, map 300 may include a destination 301 for vehicles 12*a*-12*b*-12*c*. For example, map 300 may include a point of origin 302 for vehicles 12*a*-12*b*-12*c*. Vehicle 12*a* may have traversed a first route 310, vehicle 12*b* may have traversed a second route 311, and vehicle 12*c* may have traversed a third route 312 to destination 301. Identifiers 303, 304, 305, 306, and 307 may represent detected vehicle events, also referred to jointly as a set of events that include event 303, event 304, event 305, event 306, and event 307, respectively. For example, all these events may be sudden complete stops. An event selection component similar to event selection component 110 in FIG. 1 may select a subset of vehicle events from the set in map 300. For example, the subset may include event 305, event 306, and event 307. This subset could be based on the time of day these events happened. Alternatively, and/or simultaneously, this subset could be based on physical surroundings of the locations of the events, such as a one-way street in a downtown area. Alternatively, and/or simultaneously, this subset could be based on the type of vehicle involved in the events, such as a particular type of truck.

Referring to FIG. 1, circumstance determination component 112 may be configured to determine circumstances for vehicle events. In some implementations, circumstances may be determined for at least a predefined period prior to occurrences of the selected vehicle events. The predefined period may be 30 seconds, 1 minute, 2 minutes, 3 minutes, 4 minutes, 5 minutes, 10 minutes, and/or another period. As used herein, circumstances may include context, physical surroundings, characteristics, and/or other specifics for vehicle events and/or other operations of vehicles. In some implementations, a set of circumstances may be a precursor to a particular type of vehicle event. For example, an occurrences of a set of circumstances may be likely to be followed by an occurrence of a vehicle event of the particular type. In some implementations, a set of circumstances may be a combination of elements, wherein individual elements may be independent. For example, a particular set of circumstances may include one or more of a particular time of day, a particular location, a particular weather and/or visibility condition, a particular action or actions performed by a vehicle operator, a particular action or actions performed by a vehicle, and/or other circumstances.

By way of non-limiting example, FIG. 3 illustrates map 300 depicting a geographical area around vehicles 12*a*-12*b*-12*c*, and various detected vehicle events. By way of non-limiting example, a subset of vehicle events may have been selected, as described previously, that includes event 305, event 306, and event 307. A circumstance determination component similar to circumstance determination component 112 in FIG. 1 may determine a set of circumstances that is associated with the subset of vehicles events in FIG. 3. In some implementations, a set of circumstances may be based on analyzing a predefined period prior to occurrences of the pertinent vehicle events. For example, the circumstances associated with the subset of vehicle events may include one or more of locations near a school, time of occurrence right before school begins or ends (say, between 7 am and 8 am, or between 2 pm and 3 pm), a right turn followed by hard braking, a turn at a stop sign followed by hard braking, a turn in a downtown area when weather conditions indicate fog and/or low visibility, three or more lanes going in the same direction, multiple lane changes immediately prior to a turn, more than a predetermined number of vehicle detected within a predetermined proximity (e.g., more than 10 vehicles detected going in the same direction within 50 feet), reversion of a lane change within a short amount of time (e.g., change lane and change back within 10 seconds), and/or other circumstances. For example, some of these circumstances may represent an elevated likelihood of an occurrence of a vehicle event involving a pedestrian. For example, some of these circumstances may represent an elevated likelihood that a vehicle operator acted in a rush and/or was in a hurry. For example, some of these circumstances may represent an elevated likelihood that a vehicle operator made a turn (or took another action) at a higher speed than would usually be considered prudent. By combining independent circumstances, a driving scenario is created with an elevated likelihood of an occurrence of a vehicle event immediately following (i.e., within 30 seconds, 1 minute, 2 minutes, and so forth) the occurrence of the combination of circumstances. By creating vehicle event definitions (based on these circumstances) and subsequently detecting corresponding vehicle events that represent the occurrence of these circumstances (or combinations of circumstances), batter fleet management may be facilitated. For example, vehicle operators (human or autonomous) may receive additional training on the types of driving scenarios detected through new vehicle event definitions matching the occurrences of these circumstances.

Referring to FIG. 1, vehicle event definition component 114 may be configured to create vehicle event definitions, including but not limited to a new vehicle event definition that is based on one or more circumstances. For example, a new vehicle event definition may be based on a set of circumstances determined by circumstance determination component 112.

Vehicle event distribution component 116 may be configured to distribute and/or otherwise provide vehicle event definitions to fleet 12. For example, a new vehicle event definition as created by vehicle event definition component 114 may be distributed to individual vehicles in fleet 12 of vehicles. Individual vehicles may use (new) vehicle event definitions to detect vehicle events. In particular, vehicles may use the new vehicle event definition to detect vehicle events of a type that corresponds to the new vehicle event definition. Vehicle event information regarding detected vehicle events may be received by system 100.

Vehicle event information receiving component 118 may be configured to receive additional vehicle event information from the individual vehicles in the fleet of vehicles. The additional vehicle event information may include information regarding detection of additional vehicle events. The additional vehicle events may have been detected in accordance with the new vehicle event definition.

Risk profile modification component 120 may be configured to modify risk profiles, e.g. based on received vehicle event information. For example, a risk profile may be modified based on additional vehicle event information as received by vehicle event information receiving component 118. In some implementations, risk profile modification component 120 may be configured to modify one or more of the first risk profile and/or the second risk profile based on the additional vehicle event information. For example, a risk profile may distinguish between acute vehicle events (such as a collision) and vehicle events that are a precursor to acute vehicle events (e.g., vehicle events that correspond to a new vehicle event definition created by vehicle event definition component 114).

Presentation component 122 may be configured to present, via a user interface, information regarding the vehicle event information, including but not limited to additional vehicle event information (e.g., as received by vehicle event information receiving component 118). In some implementations, presentation component 122 may be configured to store, transfer, and/or present results of system 100 and/or its components to users. In some implementations, presentation component 122 may be configured to present information resulting from one or more of the determination, estimation, comparison, analysis, and/or otherwise processing of vehicle event information, including but not limited to additional vehicle event information. For example, a fleet manager or other stakeholder may be presented with an overview of the detection of vehicle events that match new vehicle event definitions within the fleet for this year, this month, this week, etc.

In some implementations, the previously detected vehicle events may have been detected by fleet 12 of vehicles. In some implementations, the one or more types of vehicle event may involve a vehicle exceeding a speed threshold. In some implementations, by way of non-limiting example, a particular type of vehicle event may involve one or more of swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, and/or performing fuel-inefficient maneuvers. Alternatively, and/or simultaneously, these vehicle events may be categorize using multiple vehicle event types. For example, different vehicle event types may have different levels of accountability, severity, potential for damage, and/or other differences.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a vehicle, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, 118, 120, and/or 122, and/or other components. Processor(s) 128 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 128 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 128 may be configured to execute one or more additional components that may perform some or all of the functionality attributed below to one of components 108, 110, 112, 114, 116, 118, 120, and/or 122.

Figure 2:
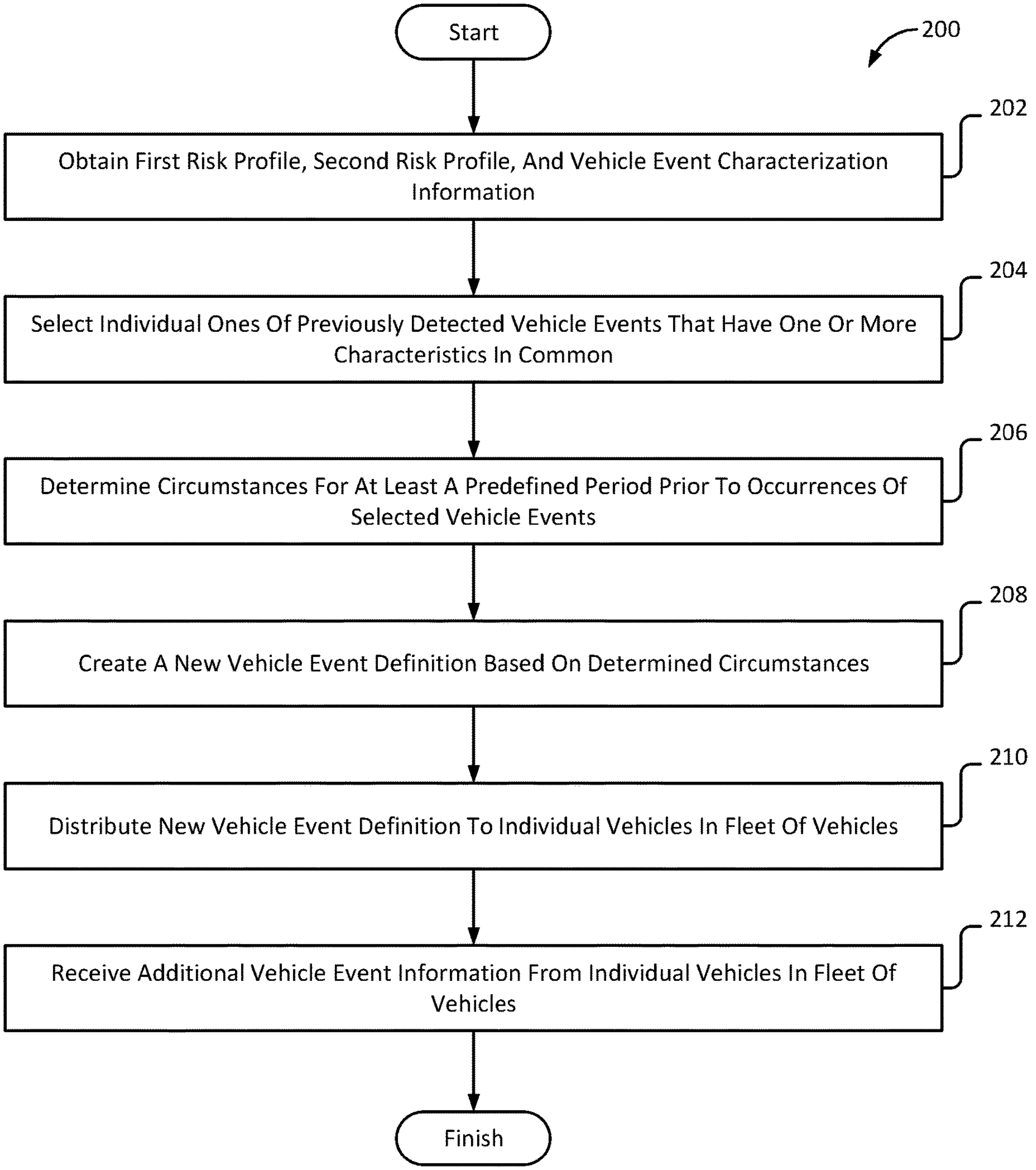
FIG. 2 includes a flow chart of a method for using risk profiles for creating and deploying new vehicle event definitions to a fleet of vehicles, in accordance with one or more implementations.

FIG. 2 illustrates a method 200 for using risk profiles for creating and deploying new vehicle event definitions to a fleet of vehicles, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a first risk profile, a second risk profile, and vehicle event characterization information. The first risk profile may be specific to a certain context for detecting vehicle events. The first risk profile may characterize a first set of values representing likelihoods of occurrences of vehicle events matching the certain context. The second risk profile may be specific to operators. The second risk profile may characterize a second set of values representing likelihoods of occurrences of vehicle events matching the operators. The vehicle event characterization information may characterize one or more types of vehicle events to be used in creating and deploying the new vehicle event definitions. Operation 202 may be performed by one or more hardware processors configured by machine-readable instructions including a component that is the same as or similar to risk profile obtaining component 108, in accordance with one or more implementations.

An operation 204 may include selecting individual ones of the previously detected vehicle events that have one or more characteristics in common. The selection may be based on one or more of the first risk profile, the second risk profile, and the vehicle event characterization information. Operation 204 may be performed by one or more hardware processors configured by machine-readable instructions including a component that is the same as or similar to event selection component 110, in accordance with one or more implementations.

An operation 206 may include determining circumstances for at least a predefined period prior to occurrences of the selected vehicle events. Operation 206 may be performed by one or more hardware processors configured by machine-readable instructions including a component that is the same as or similar to circumstance determination component 112, in accordance with one or more implementations.

An operation 208 may include creating a new vehicle event definition based on the determined set of circumstances and/or physical surroundings. Operation 208 may be performed by one or more hardware processors configured by machine-readable instructions including a component that is the same as or similar to vehicle event definition component 114, in accordance with one or more implementations.

An operation 210 may include distributing the new vehicle event definition to individual vehicles in the fleet of vehicles. Operation 210 may be performed by one or more hardware processors configured by machine-readable instructions including a component that is the same as or similar to vehicle event distribution component 116, in accordance with one or more implementations.

An operation 212 may include receiving additional vehicle event information from the individual vehicles in the fleet of vehicles. The additional vehicle event information may include information regarding detection of additional vehicle events. The additional vehicle events may have been detected in accordance with the new vehicle event definition. Operation 212 may be performed by one or more hardware processors configured by machine-readable instructions including a component that is the same as or similar to vehicle event information receiving component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for creating and deploying new vehicle event definitions to a fleet of vehicles including a first vehicle configured to detect first vehicle events by the first vehicle and a second vehicle configured to detect second vehicle events by the second vehicle, by using particular information that includes a risk profile, wherein the risk profile is specific to a certain context for detecting vehicle events, wherein the risk profile characterizes a first set of values representing likelihoods of occurrences of vehicle events matching the certain context, the system comprising:

one or more hardware processors configured by machine-readable instructions to select individual ones of previously-detected vehicle events that have one or more characteristics in common, wherein the selection is based on the risk profile;

determine circumstances prior to occurrences of the selected individual ones of the previously-detected vehicle events;

create a new vehicle event definition based on the circumstances prior to occurrences of the selected individual ones of the previously-detected vehicle events;

transfer instructions that include the new vehicle event definition to the first and second vehicle, wherein the instructions are transferred electronically across an electronic communication network that connects the system to the first vehicle and the second vehicle, wherein the instructions instruct the first and second vehicle to detect new vehicle events satisfying the new vehicle event definition; and take one or more actions based on detections of the new vehicle events satisfying the new vehicle event definition.

2. The system of claim 1, wherein the one or more actions include prompting one or more vehicle operators of the first vehicle and the second vehicle to perform a recommended maneuver.

3. The system of claim 2, wherein the recommended maneuver includes a lane change.

4. The system of claim 2, wherein the recommended maneuver includes changing speed of at least one of the first vehicle and the second vehicle.

5. The system of claim 1, further comprising the first vehicle and the second vehicle.

6. The system of claim 1, wherein the first set of values is based on vehicle event information, wherein the previously-detected vehicle events have been detected by individual vehicles in the fleet of vehicles, wherein the vehicle event information includes the certain context for the previously-detected vehicle events and one or more operators for the previously-detected vehicle events.

7. The system of claim 1, wherein the certain context for detecting vehicle events includes one or more of location, local weather, heading of one or more vehicles, and/or traffic conditions.

8. The system of claim 1, wherein the certain context for detecting vehicle events includes one or more of objects on roadways during detection of vehicle events, other incidents within a particular timeframe of detection of vehicle events, time of day, lane information, and/or presence of autonomously operated vehicles within a particular proximity.

9. The system of claim 1, wherein the vehicle events include vehicle events of one or more types including a first type of vehicle event, and wherein the first type of vehicle event involves a vehicle exceeding a speed threshold.

10. The system of claim 1, wherein the vehicle events include vehicle events of one or more types including a first type of vehicle event, and wherein the first type of vehicle event involves one or more of swerving, a U-turn, free-wheeling, over-revving, lane-departure, short following distance, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change, speeding, running a red light, running a stop sign, parking a vehicle, and/or performing fuel-inefficient maneuvers.

11. The system of claim 1, wherein the one or more actions include modifying a previously-scheduled route.

12. A method of creating and deploying new vehicle event definitions to a fleet of vehicles including a first vehicle that detects first vehicle events and a second vehicle that detects second vehicle events, by using particular information, the method being implemented in a computer system that includes one or more hardware processors, wherein the particular information includes a risk profile, wherein the risk profile is specific to a certain context for detecting vehicle events, wherein the risk profile characterizes a first set of values representing likelihoods of occurrences of vehicle events matching the certain context, the method comprising:

selecting individual ones of previously-detected vehicle events that have one or more characteristics in common, wherein the selection is based on the risk profile;

determining circumstances prior to occurrences of the selected individual ones of the previously detected vehicle events;

creating a new vehicle event definition based on the circumstances prior to occurrences of the selected ones of the previously-detected vehicle events;

transferring instructions that include the new vehicle event definition to the first and second vehicle, wherein the instructions are transferred electronically across an electronic communication network that connects the computer system to the first vehicle and the second vehicle, wherein the instructions instruct the first and second vehicle to detect new vehicle events matching the new vehicle event definition; and taking one or more actions based on detections of the new vehicle events satisfying the new vehicle event definition.

13. The method of claim 12, wherein the one or more actions include prompting one or more vehicle operators of the first vehicle and the second vehicle to perform a recommended maneuver.

14. The method of claim 13, wherein the recommended maneuver includes a lane change.

15. The method of claim 13, wherein the recommended maneuver includes changing speed of at least one of the first vehicle and the second vehicle.

16. The method of claim 12, wherein the first set of values is based on vehicle event information, wherein the previously-detected vehicle events have been detected by individual vehicles in the fleet of vehicles, wherein the vehicle event information includes the certain context for the previously-detected vehicle events and one or more operators for the previously-detected vehicle events.

17. The method of claim 12, wherein the certain context for detecting vehicle events includes one or more of location, local weather, heading of one or more vehicles, and/or traffic conditions.

18. The method of claim 12, wherein the certain context for detecting vehicle events includes one or more of objects on roadways during detection of vehicle events, other incidents within a particular timeframe of detection of vehicle events, time of day, lane information, and/or presence of autonomously operated vehicles within a particular proximity.

19. The method of claim 12, wherein the one or more actions include modifying a previously-scheduled route.

* * * * *